(12) United States Patent
Ikazaki

(10) Patent No.: US 9,665,484 B2
(45) Date of Patent: May 30, 2017

(54) ELECTRONIC APPARATUS HAVING NONVOLATILE MEMORY AND PROGRAM WRITING METHOD FOR UPDATING

(71) Applicant: KYOCERA Document Solutions Inc., Osaka (JP)

(72) Inventor: Akihiko Ikazaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/806,414

(22) Filed: Jul. 22, 2015

(65) Prior Publication Data

US 2016/0026563 A1 Jan. 28, 2016

(30) Foreign Application Priority Data

Jul. 22, 2014 (JP) .................................. 2014-148522

(51) Int. Cl.
*G06F 3/06* (2006.01)
*G06F 12/06* (2006.01)

(52) U.S. Cl.
CPC .. *G06F 12/0638* (2013.01); *G06F 2212/1032* (2013.01)

(58) Field of Classification Search
CPC .......... G06F 3/123; G06F 3/1279; G06F 8/65; G06F 8/665; G06F 9/24; G06F 9/4406; G06F 9/4411; G06F 11/1433; G06F 12/0638; G06F 2212/032; G06F 12/0246; G06F 2212/205; H04N 2201/094; H04N 1/00; H04N 1/00938; G11C 14/00
See application file for complete search history.

(56) References Cited

U.S. PATENT DOCUMENTS

| 7,142,321 B2 * | 11/2006 | Tomita | H04N 1/00204 |
| | | | 358/1.15 |
| 7,876,469 B2 * | 1/2011 | Hanada | G06F 8/65 |
| | | | 358/1.13 |
| 2004/0145766 A1 * | 7/2004 | Sugishita | G06F 8/65 |
| | | | 358/1.13 |
| 2007/0266202 A1 * | 11/2007 | Mukaida | G06F 9/4401 |
| | | | 711/103 |

(Continued)

FOREIGN PATENT DOCUMENTS

JP 2000-035919 A 2/2000

*Primary Examiner* — Hiep Nguyen
(74) *Attorney, Agent, or Firm* — Hawaii Patent Services; Nathaniel K. Fedde; Kenton N. Fedde

(57) ABSTRACT

Provided is an electronic apparatus avoiding to be a starting failure status even if power off happens during the writing of a program. The electronic apparatus includes a rewritable nonvolatile memory, volatile memory, and a processor. The nonvolatile memory memorizes a plurality of programs. The volatile memory memorizes a plurality of programs for updating. The processor makes the plurality of programs memorize in volatile memory and writes in the plurality of programs for updating in a nonvolatile memory. In this case, in the state of reserving the start processing program and the header information before updating, a processor writes in the start processing program for updating, beforehand. Subsequently, the processor writes in the header information for updating. After that, the processor writes in the executive operation program for updating.

3 Claims, 5 Drawing Sheets

(56) References Cited

U.S. PATENT DOCUMENTS

| | | | | |
|---|---|---|---|---|
| 2008/0030817 A1* | 2/2008 | Nagasawa | .......... | H04N 1/00204 358/537 |
| 2008/0263540 A1* | 10/2008 | Bando | ............ | G06F 8/68 717/173 |
| 2012/0200891 A1* | 8/2012 | Tokumoto | ............ | G06F 8/62 358/1.15 |
| 2013/0263107 A1* | 10/2013 | Hamakawa | ............ | G06F 8/65 717/168 |
| 2014/0136826 A1* | 5/2014 | Paek | ............ | G06F 9/4401 713/1 |

* cited by examiner

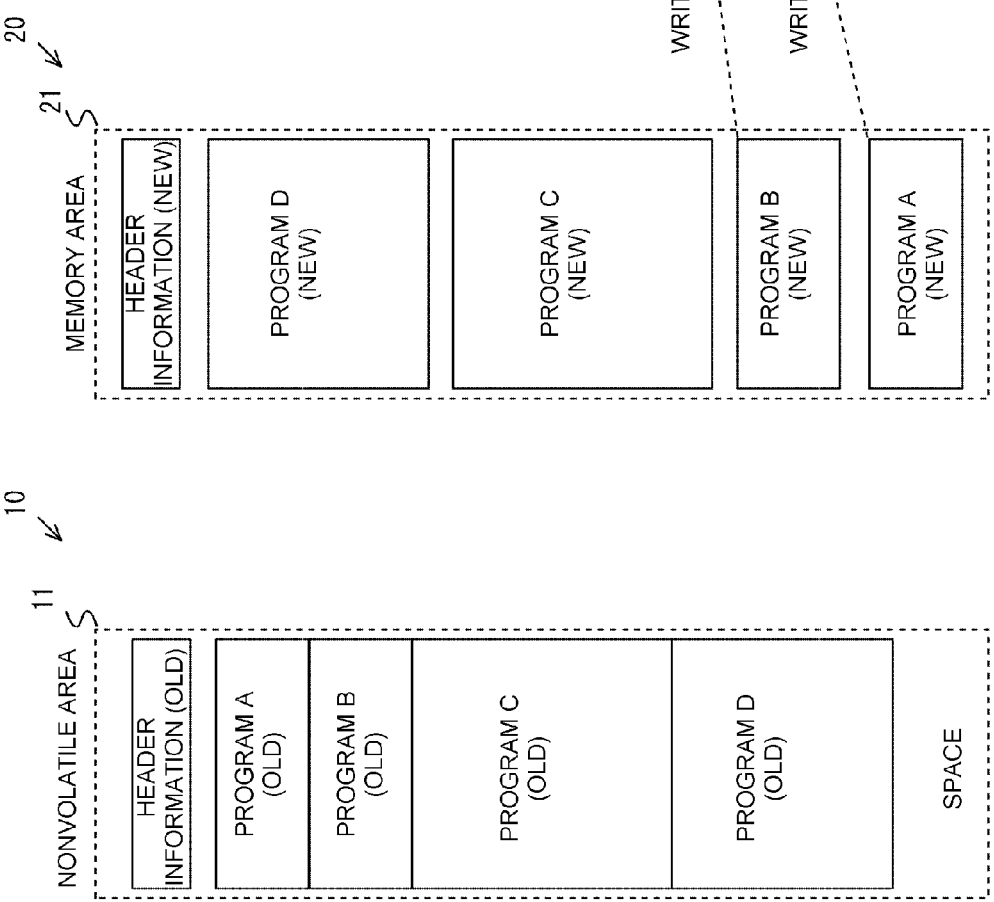

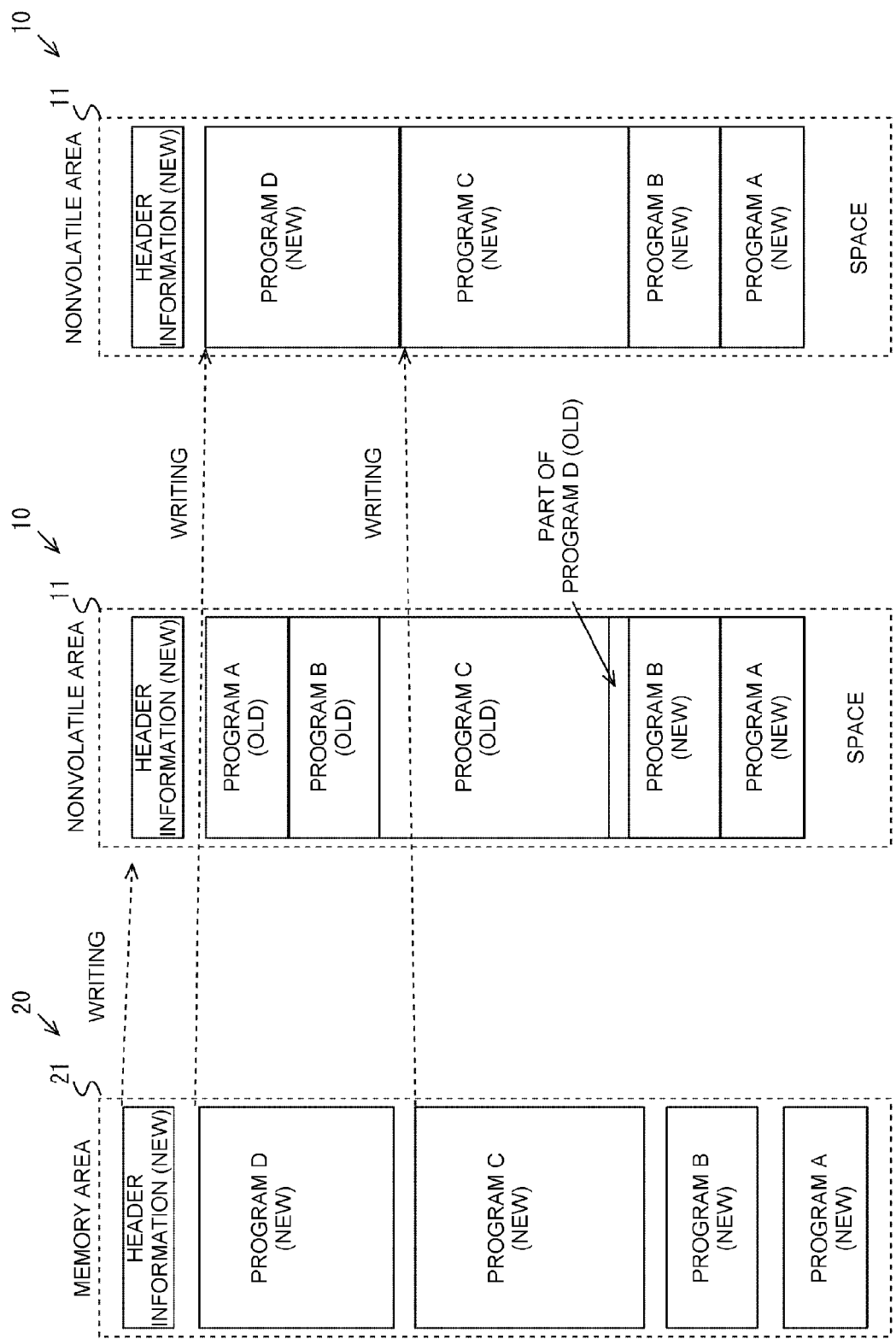

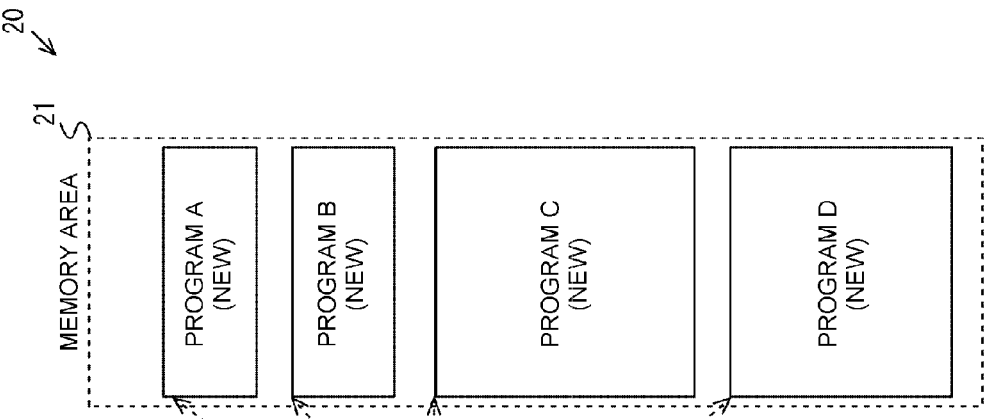
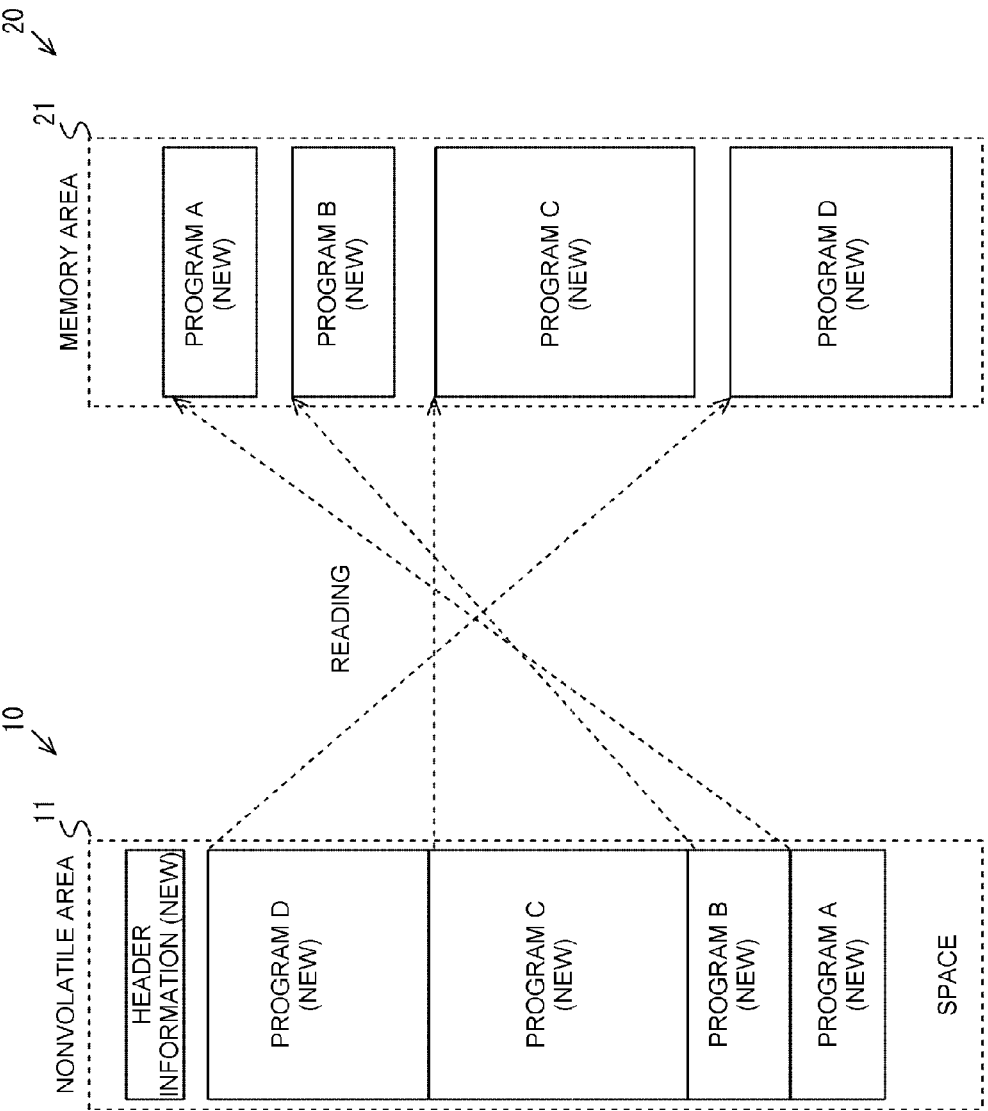

ELECTRONIC APPARATUS HAVING NONVOLATILE MEMORY AND PROGRAM WRITING METHOD FOR UPDATING

INCORPORATION BY REFERENCE

This application is based on and claims the benefit of priority from Japanese Patent Application No. 2014-148522 filed on Jul. 22, 2014, the contents of which are hereby incorporated by reference.

BACKGROUND

The present disclosure is related with an electronic apparatus having a nonvolatile memory, and a program writing method for updating.

An image forming apparatus is an example of an electronic apparatus. Image forming apparatuses, such as an MFP (Multifunction Peripheral), have a multi-operational function of each job, such as a copy, a print, and FAX (Facsimile) a user box function, or the like. The image forming apparatus has a nonvolatile memory that stores an application program and data needed for executing each function (hereinafter, it just calls a "program," which is an abbreviation.) As the nonvolatile memory, NAND flash memory, or the like, are used, generally. In addition, by storing the program in the nonvolatile memory, it is possible to accelerate for reading the program from the nonvolatile memory.

By the way, the program stored in the nonvolatile memory may be rewritten (update) when extension of a function, or the like, are performed.

Incidentally, in a typical case, there is a controlling method of a flash type memory that is a nonvolatile memory and stores management information of a subordinate block of the program area of the flash type memory in a block header. In this case, when performing an area change, the management information of a corresponding block is reflected, correctly.

SUMMARY

An electronic apparatus of the present disclosure includes a rewritable nonvolatile memory, a volatile memory, and a processor. The nonvolatile memory memorizes a plurality of programs including a start processing program needed for a start processing, an executive operation program needed for the executive operation of a function, and header information having information about the start processing programs and the executive operation program. The volatile memory memorizes the plurality of programs for updating. The processor makes the plurality of programs memorize in the volatile memory and writes in the plurality of programs for updating in the nonvolatile memory. Also, when the processor writes the plurality of programs for updating in the nonvolatile memory, in the state that the start processing program and the header information before updating are reserved, the start processing program for updating is written in beforehand. Subsequently, the processor writes the header information for updating. Next, the processor writes the executive operation program for updating.

A program writing method for updating of the present disclosure is a program writing method for updating the electronic apparatus that has a rewritable nonvolatile memory and a volatile memory. A plurality of programs including a start processing program needed for a start processing, an executive operation program needed for the executive operation of a function, and header information that has the information about the start processing programs and the executive operation program are memorized in the volatile memory. Then, a plurality of programs for updating are written in the nonvolatile memory. When writing the plurality of programs for updating in the nonvolatile memory, in the state that the start processing program and the header information before updating are reserved, the start processing program for updating is written in beforehand. Subsequently, the header information for updating is written in. Next, the executive operation program for updating is written in.

BRIEF DESCRIPTION OF THE DRAWINGS

FIG. 2A is a figure for explaining a program before updating in a nonvolatile area of a nonvolatile memory in the electronic apparatus shown in FIG. 1;

FIG. 2B is a figure for explaining a program for updating read in a memory area of RAM in the electronic apparatus shown in FIG. 1;

FIG. 2C is a figure for explaining that a part of the program for updating in the memory area of RAM is written in a nonvolatile area of the nonvolatile memory of the electronic apparatus shown in FIG. 1;

FIG. 3A is a figure for explaining new header information of the program for updating read in the memory area of RAM about rewriting of the program in the nonvolatile memory of the electronic apparatus shown in FIG. 1;

FIG. 3B is a figure for explaining that new header information is written in the nonvolatile area of the nonvolatile memory about rewriting of the program in the nonvolatile memory of the electronic apparatus shown in FIG. 1;

FIG. 3C is a figure for explaining that the remaining of the program for updating in the memory area of RAM is written in the nonvolatile area of the nonvolatile memory about rewriting of the program in the nonvolatile memory of the electronic apparatus shown in FIG. 1;

FIG. 4A is a figure for explaining the program after rewriting in a nonvolatile memory, if the rewritten program in the nonvolatile memory of the electronic apparatus shown in FIG. 1 is read to the memory area of RAM;

FIG. 4B is a figure for explaining that the program of a nonvolatile memory is written in the memory area of RAM, when the rewritten program in the nonvolatile memory of the electronic apparatus shown in FIG. 1 is read in the memory area of RAM;

DETAILED DESCRIPTION

Hereinafter, an embodiment of the electronic apparatus of the present disclosure is explained with referring to FIG. 1-FIG. 5. In addition, as an example of an electronic apparatus in the following explanation, an image forming apparatus, information terminal equipment, or the like, are applicable. An image forming apparatus is, for example, an MFP (Multifunction Peripheral), which is complex peripheral equipment that equips a plurality of functions, such as a printer function, a facsimile function, and a scanning function, or a printer, or the like.

Figure 1:
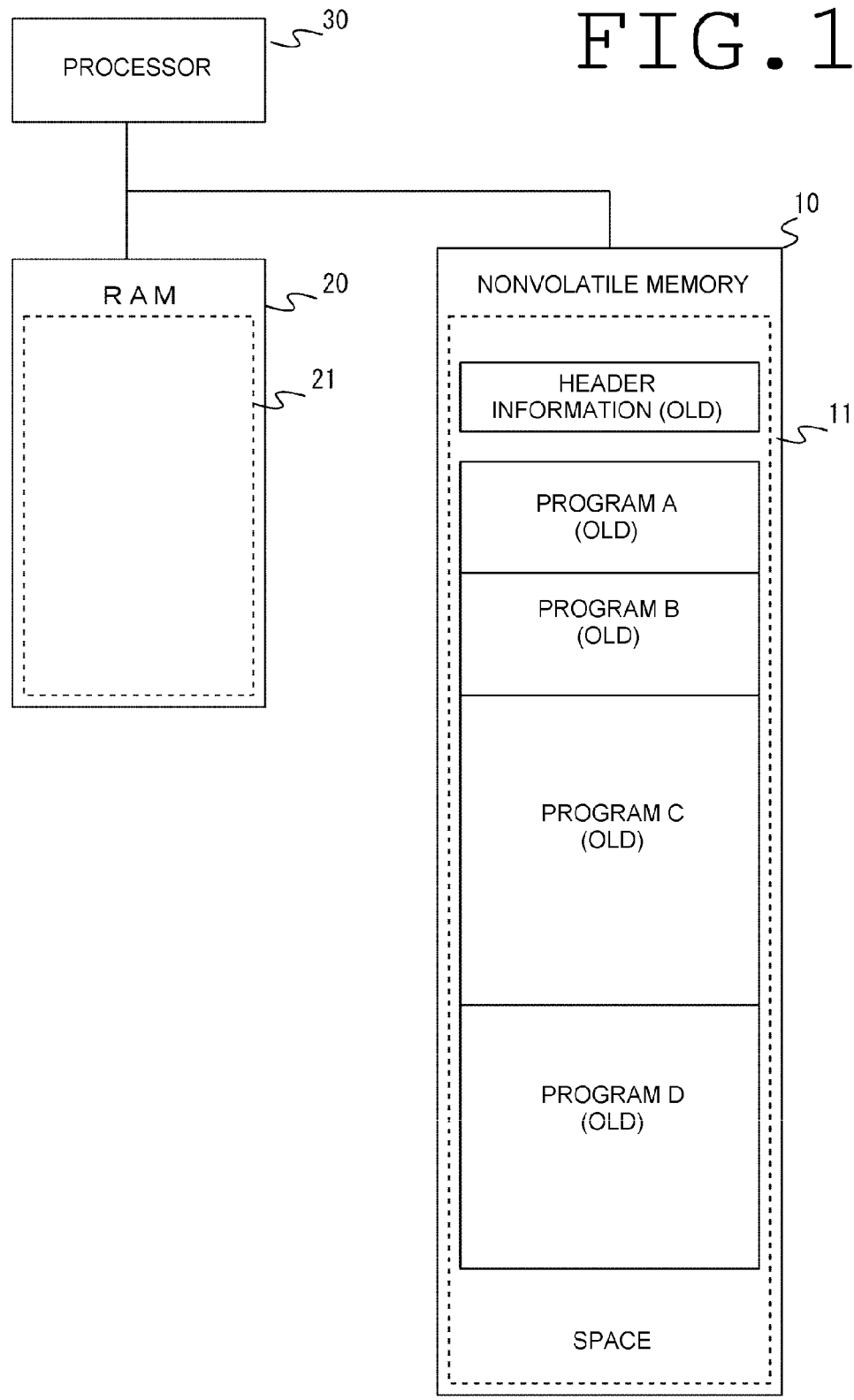
FIG. 1 is a perspective view illustrating an embodiment of an electronic apparatus of the present disclosure.

Firstly, the electronic apparatus shown in FIG. 1 includes nonvolatile memory 10, RAM (Random Access Memory) 20, and processor 30. Nonvolatile memory 10 is NAND flash memory, or the like, for example. RAM 20 is an example of volatile memory. Processor 30 is MPU (Micro Processing Unit) or the like.

In nonvolatile area 11 of nonvolatile memory 10, header information (old) and program A (old)-program D (old) are written in. Here, (old) means the program before updating. In addition, the program for updating indicates as (new). The program for updating is a new program accompanying extension of a function, or the like, and these are described later.

Also, header information (old) includes an identifier that shows header information (old), size of header information (old), information of programs A (old)-D (old), information that indicates end of programs A (old)-D (old), information that indicates a head position of each program A (old)-D (old), or the like. Also, the information on programs A (old)-D (old) includes an identifier for identifying each program A (old)-D (old), size of each program A (old)-D (old), attached information (version information, or the like) of each program A (old)-D (old), or the like. In addition, in nonvolatile memories 10, such as NAND flash memory, a bad block may be present. Accordingly, the size of each program A (old)-D (old) serves as a size that is considered the size of the bad block. However, the explanation is omitted here.

Also, program A (old) is an executive program for system startups, for example. Also, program B (old) is an executive program for making update, for example. Programs C (old) and D (old) are executive programs for executing either of functions, such as a printer function, a facsimile function, a scanning function, or the like, which are mentioned above.

Processor 30 executes boot processing, when the power supply is turned on. Next, processor 30 refers to the header information (old) in nonvolatile memory 10. Processor 30 reads program A for system startups (old) and writes it in RAM 20. Then, processor 30 performs a start processing based on program A (old). Also, after completing a start processing, based on start instruction, processor 30 reads programs C (old) and D (old), and writes them in RAM 20. Processor 30 performs executive operation based on programs C (old) and D (old). Start instruction is instructed by the user about either of the functions, such as the printer function, the facsimile function, the scanning function, or the like, as mentioned above.

Also, processor 30 rewrites the program in nonvolatile memory 10 accompanying extension of a function, or the like (update). In this case, processor 30 writes programs A (new)-D (new), which are the programs for updating obtained from the server in a network or the SD card, in memory area 21 of RAM 20. Next, processor 30 generates header information (new) and writes in programs A (new)-D (new) to nonvolatile memory 10 after that. It is described later for details. In addition, in case that nonvolatile memory 10 is NAND flash memory, or the like, it cannot overwrite the program. Accordingly, the writing of the program is performed after data erasing of nonvolatile area 11 according to the size of the program for updating.

Then, with reference to FIG. 2A-FIG. 3C, rewriting (update) of the program by processor 30 in nonvolatile memory 10 accompanying extension of the function, or the like, is explained. The program for updating that becomes the source of rewriting as mentioned above is obtained from the SD card (Secure Digital memory card) the server on the network, or the like.

Firstly, as indicated in FIG. 2A, header information (old) and programs A (old)-D (old) are written in nonvolatile area 11 of nonvolatile memory 10. Here, (old) means the program before updating, as mentioned above.

Processor 30 reads the header information (old) before updating from nonvolatile area 11 of nonvolatile memory 10 and confirms the size and arrangement order of each program A (old)-D (old). Also, processor 30 writes programs A (new)-D (new) that are the programs for updating in memory area 21 of RAM 20 by program B for making update (old). The program for updating is obtained from the SD card or the server on the network as mentioned above.

At this time, for example, as shown in FIG. 2A, program A for the system startups (old) and program B for making update (old) before updating are written in first half of nonvolatile area 11. In this case, as shown in FIG. 2B, programs A (new) and B (new) for updating are written in second half of memory area 21 of RAM 20. Also, programs C (new) and D (new) for updating are written in the first half of memory area 21 of RAM 20. That is, it writes in memory area 21 of RAM 20 in order to be reverse of the arrangement order in nonvolatile area 11 of nonvolatile memory 10.

Also, processor 30 generates new header information (new). In the header information (new), as the same as that of the above, the identifier that shows header information (new), the size of header information (new), the information of programs A (new)-D (new), the information that shows the end of programs A (new)-D (new), and the information that shows the head position of each program A (new)-D (new) are included. In addition, in the information on programs A (new)-D (new), as the same as that of the above, the identifier for identifying each program A (new)-D (new), the size of each program A (new)-D (new), the attached information (version information, or the like) of each program A (new)-D (new) are included.

Also, in the header information (new), as shown in FIG. 2B, the information that shows the arrangement of programs A (new)-D (new) for updating, or the like, which are written in memory area 21 of RAM 20 is included. That is, in the header information (new), the information that indicates the arrangement of programs A (new)-D (new) for updating is reverse of arrangement of programs A (old)-D (old) before updating written in nonvolatile memory 10 is included.

Thus, in the present embodiment, as indicated in FIG. 2B-FIG. 2C, by processor 30, it has reserved programs A (old) and B (old) needed for the start processing in nonvolatile area 11 of nonvolatile memory 10. In this state, programs A (new) and B (new) are written in beforehand. In this case, either of program A (new) or program B (new) may be written in first. However, here, it explains an example that program A (new) is written beforehand.

Also, as indicated in FIG. 2C, programs A (new) and B (new) are written in a different position from programs A (old) and B (old). Also, the remaining programs C (new) and D (new) are written after being written programs A (new) and B (new), as shown in after-mentioned FIG. 3C. In this case, whichever of program C (new) or program D (new) may also be written in first. However, here, it explains an example that program C (new) is written beforehand.

As mentioned above, all the programs A (new)-D (new) are written in nonvolatile area 11 of nonvolatile memory 10. Then, as indicated in after-mentioned FIG. 3C, it becomes reverse of arrangement of programs A (old)-D (old) before updating. Therefore, in the header information (new), as mentioned above, the information that indicates that the arrangement becomes reverse of the arrangement of programs A (old)-D (old) before updating is included.

In this way, as shown in FIG. 2B, in the header information (new), the information that indicates the arrangement of programs A (new)-D (new) for updating, which are written in memory area 21 of RAM 20, or the like, is included. That is, the information that indicates the arrangement of programs A (new)-D (new) for updating becomes reverse of the arrangement of programs A (old)-D (old) before updating written in nonvolatile memory 10 is included.

Thereby, after all the programs A (new)-D (new) for updating are written in nonvolatile area 11 of nonvolatile memory 10, by referring to the header information (new), reading of the programs A (new)-D (new) can be ensured.

Also, for example, while program C (new) and program D (new) for updating being written in, a user may accidentally turn off a power supply, or a power OFF by power failure, or the like, may be happened. Even in the case, arrangement of program A (new) and program B (new), or the like, can be confirmed by referring with the header information (new) reserved in nonvolatile memory 10.

Also, after writing the programs A (new) and B (new) in nonvolatile area 11 of nonvolatile memory 10, as shown in FIG. 3A-FIG. 3B, processor 30 writes the header information (new) of memory area 21 of RAM 20 in nonvolatile area 11 of nonvolatile memory 10. In addition, as writing of the header information (new), as shown in FIG. 3B, it is carried out to a different area from the area where the program A (old), B (old), and C (old), B (new), and A (new) are written in. This is, for example, as shown in after-mentioned FIG. 3C, for making it not deleted, at the time that programs C (new) and D (new) are written in.

Also, after completing the writing of header information (new), as shown in FIG. 3C, processor 30 writes the remaining programs C (new) and D (new) in nonvolatile area 11 of nonvolatile memory 10.

In addition, in FIG. 2B-FIG. 2C as mentioned above, a case, while programs A (new) and B (new) are written in, the user turns off the power supply accidentally or the power OFF by power failure, or the like, is happened, is also considered. Even in this case, as indicated in FIG. 2C, header information (old) needed for a start processing, program A (old), and program B (old) are written in nonvolatile area 11 of nonvolatile memory 10. Therefore, reloading of program A (old) and program B (old) becomes possible, and rewriting of programs A (new)-D (new) in nonvolatile area 11 of nonvolatile memory 10 also becomes possible.

Also, a case, while being written in the remaining programs C (new) and D (new) in FIG. 3 A-C, a user accidentally turns off a power supply, or a power OFF by power failure, or the like, happens is also considered. Even in the case, as indicated in FIG. 3C, the header information (new) needed for the start processing, programs A (new) and B (new) are written in nonvolatile area 11 of nonvolatile memory 10. Therefore, it is enabled of the rewriting of programs A (new)-D (new) by reading programs A (new) and B (new).

However, in FIG. 3A-FIG. 3B, a case, while header information (new) is written in, a user accidentally turns off a power supply, or the power OFF by power failure, or the like, is happened is also considered. In this case, header information (new) and header information (old) needed for the start processing is deleted. In this case, as indicated in FIG. 3B, program A (old), B (old), and C (old), B (new), and A (new) are written in nonvolatile area 11 of nonvolatile memory 10. Therefore, in the case of the start processing, processor 30 reads programs A (old) and B (old) in the head of nonvolatile area 11. This is realizable by a setup or a program. Thereby, as explained as in FIG. 2A, processor 30 can write programs A (new)-D (new) in memory area 21 of RAM 20 based on program B (old) for making update. Programs A (new)-D (new) are the programs for updating obtained from the SD card or the server on the network, as mentioned above. Thereby, as the same as that of the above, it is enabled of the rewriting of programs A (new)-D (new) by reading programs A (new) and B (new).

Then, with reference to FIG. 4A and FIG. 4B, at the time of the start processing, a case where the programs A (new)-D (new) in nonvolatile memory 10 are read in memory area 21 of RAM 20 by processor 30 is explained.

First, as shown in FIG. 4A, the header information (new) and the programs A (new)-D (new) are written in nonvolatile area 11 of nonvolatile memory 10 by rewriting of the programs A (new)-D (new) for updating, as mentioned above. Here, firstly, processor 30 refers to the header information (new) and extracts offset and size of each program A (new)-D (new). Then, as indicated in FIG. 4B, based on the offset, a part for the needed size of each program A (new)-D (new) is read, and programs A (new)-D (new) are written in memory area 21 of RAM 20.

In addition, the offset is size from the head of nonvolatile area 11 of nonvolatile memory 10 to the writing position of each program A (new)-D (new). That is, processor 30 executes the boot processing, when the power supply is turned on. Next, with referencing to the header information (new) in nonvolatile memory 10, processor 30 reads program A for system startups (new) and writes it in RAM 20. Processor 30 performs the start processing based on the program A (new). Therefore, firstly, according to the offset and the size of program A (new), reading from nonvolatile memory 10 is performed, and program A (new) is written in the head of memory area 21 of RAM 20.

Then, by reading of program B (new) is performed, program B (new) is written in afterward of program A (new) in memory area 21 of RAM 20. In addition, as in programs C (new) and D (new), when start instruction is accepted, reading them from nonvolatile memory 10 is performed, and they are written in memory area 21 of RAM 20. The start instruction is a instruction by a user to start either of the printer function, the facsimile function, the scanning function, or the like, as mentioned above.

Figure 5:
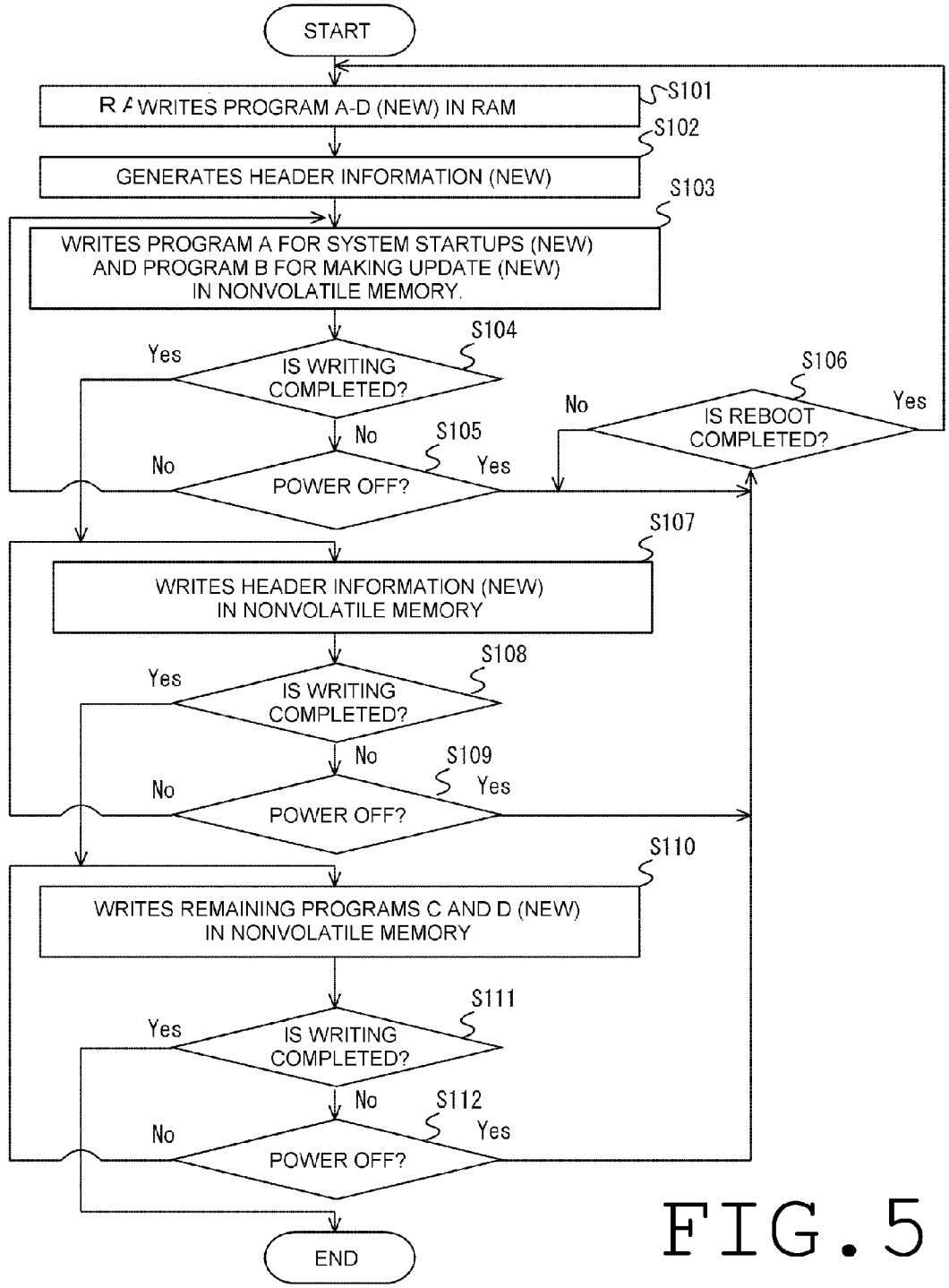
FIG. 5 is a flow chart for explaining the rewriting process of the program in the nonvolatile memory of the electronic apparatus shown in FIG. 1.

Then, with reference to FIG. 5, a rewriting process of programs A (new)-D (new) in nonvolatile memory 10 by processor 30 is explained.

(Step S101)

Processor 30 executes boot process when the power supply is turned on. Then, processor 30 reads the header information (old) in nonvolatile memory 10 shown in FIG. 2A and confirms the size and the arrangement order of each program A-D. Also, when reading program A (old) and executes a system startup, processor 30 writes program A (old) in memory area 21 of RAM 20. Also, processor 30 writes programs A (new)-D (new) in memory area 21 of RAM 20 based on program B for making update. Programs A (new)-D (new) are updating programs obtained from the SD card or the server on the network.

At this time, in the example of FIG. 2A, program A (old) for the system startups before updating and program B (old) for making update are written in the first half of nonvolatile area 11. In this case, processor 30 writes programs A and B (new) in the second half of memory area 21 of RAM 20 and writes programs C and D (new) in the first half of memory area 21 of RAM 20.

(Step S102)

Subsequently, processor 30 generates header information (new) and writes it in memory area 21 of RAM 20. As mentioned above, in this header information (new), the information that indicates the arrangement of programs A (new)-D (new) for updating become reverse of the arrangement of programs A (old)-D (old) before updating written in nonvolatile memory 10 is included.

(Step S103)

Subsequently, processor 30 writes program A (new) and program B (new) in nonvolatile area 11 of nonvolatile memory 10 at first.

(Step S104)

Subsequently, processor 30 determines whether or not the writing of programs A (new) and B (new) is completed. If writing is completed (Step S104: Yes), it advances to Step S107. On the other hand, if writing is not completed (Step S104: No), it advances to Step S105.

(Step S105)

Processor 30 determines whether or not power OFF is happened. That is, when the user accidentally turns off the power supply, or the power OFF by power failure, or the like, is happened, as mentioned above, processor 30 determines that the power OFF is happened (Step S105: Yes) and advances to Step S106. On the other hand, if the power OFF is not happened (Step S105: No), it returns to Step S103.

(Step S106)

Processor 30 returns to Step S101 when the power supply is turned on again. Processor 30 executes the boot processing. Then, based on program B for making update, processor 30 writes programs A (new)-D (new) in memory area 21 of RAM 20 and performs processes from Step S102. Programs A (new)-D (new) are updating programs obtained from the SD card or the server on the network.

(Step S107)

When the writing of programs A (new) and B (new) is completed, processor 30 writes the header information (new) of memory area 21 of RAM 20 in nonvolatile area 11 of nonvolatile memory 10, as shown in FIG. 3A-FIG. 3B. The writing of header information (new) is performed in the different area from the writing area of programs A (new)-D (new).

(Step S108)

Subsequently, processor 30 determines whether or not the writing of header information (new) is completed. If writing is completed (Step S108: Yes), it advances to Step S110. On the other hand, if writing is not completed (Step S108: No), it advances to Step S109.

(Step S109)

Processor 30 determines whether or not the power OFF is happened. If processor 30 determines that the power OFF is happened (Step S109: Yes), it advances to Step S106. On the other hand, if the power OFF is not happened (Step S109: No), it returns to Step S107.

Here, while the writing of the header information (new) in FIG. 3A-FIG. 3B, if the user accidentally turned off the power supply, or the power OFF by power failure, or the like, is happened, the header information (new) and the header information (old) needed for the start processing is deleted. In this case, as explained in FIG. 3B, program A (old), B (old), and C (old), B (new), and A (new) are written in nonvolatile area 11 of nonvolatile memory 10. Therefore, it sets up (programming) as processor 30 reads programs A (old) and B (old) of the head of nonvolatile area 11 in the case of the start processing. Thereby, based on program B for making update (old), programs A (new)-D (new) can be written in memory area 21 of RAM 20 (Step S101). Programs A (new)-D (new) are the programs for updating obtained from the SD card or the server on the network. Thereby, processing from Step S102 can be performed.

(Step S110)

When writing of the header information (new) is completed, as shown in FIG. 3C, processor 30 writes the remaining programs C and D (new) in nonvolatile area 11 of nonvolatile memory 10.

(Step S111)

Processor 30 determines whether or not the writing of the remaining programs C and D (new) is completed. Processing is ended if the writing is completed (Step S111: Yes). On the other hand, if the writing is not completed (Step S111: No), it advances to Step S112.

(Step S112)

Processor 30 determines whether or not the power OFF is happened. If it determines that the power OFF is happened (Step S112: Yes), it advances to Step S106. On the other hand, if the power OFF is not happened (Step S112: No), it returns to Step S110. In addition, even if the power OFF is happened while the remaining programs C and D (new) are written in, nonvolatile area 11 of nonvolatile memory 10 is in a state as shown in FIG. 3C. That is, the header information (new) needed for the start processing and programs A (new) and B (new) are written in nonvolatile area 11 of nonvolatile memory 10. Therefore, processes from Step S101 can be performed by reading programs A (new) and B (new).

In this way, in the present embodiment, the plurality of programs A (new)-D (new) for updating are written in nonvolatile memory 10 by processor 30. In this case, where the start processing program (program A (old), program B (old)) and header information (old) before updating are reserved, the start processing program for updating (program A (new), program B (new)) are written in beforehand. Subsequently, the header information (new) for updating is written in. After that, the executive operation program for updating (program C (new), program D (new)) are written in.

Thereby, even if a case, while being written in the start processing program for updating (program A (new), program B (new)), the user accidentally turned off the power supply, or the power OFF by power failure, or the like, is happened, the header information (old) and the start processing program (program A (old), program B (old)) before updating is remained in nonvolatile memory 10. Therefore, based on the header information (old) and the start processing program (program A (old), program B (old)) before updating, it is enabled of rewriting the programs A (new)-D (new) for updating, or the like.

Also, even if a case, while the header information (new) for updating is written in, the user accidentally turned off the power supply, or the power OFF by power failure, or the like, is happened, the start processing program (program A (old), program B (old)) before updating remains in nonvolatile memory 10. Therefore, it is enabled of rewriting programs A (new)-D (new) for updating, or the like, based on the start processing program (program A (old), program B (old)) before updating.

Also, even if a case, while the executive operation program for updating (program C (new), program D (new)) is written in, the user accidentally turned off the power supply, or the power OFF by power failure, or the like, is happened, the header information (new) and the start processing program (program A (new), program B (new)) for updating is remained in nonvolatile memory 10. Accordingly, it is enabled of rewriting, programs A (new)-D (new) for updating, or the like, based on the header information and the start processing program for updating.

In this way, even if a case, while writing the plurality of programs A (new)-D (new) for updating in nonvolatile memory 10, the user accidentally turned off the power supply, or the power OFF by power failure, or the like, is happened, the program needed for rewriting, such as programs A (new)-D (new) for updating, or the like, are reserved in nonvolatile memory 10. Accordingly, rewriting the programs A (new)-D (new) for updating, or the like, can be ensured, and it can avoid to be a starting failure status.

Also, according to the present embodiment, when the plurality of programs are memorized in RAM 20 (a volatile memory) by processor 30, the header information (new) is generated. The header information (new) has the information, which indicates that the arrangement of the plurality of programs for updating is reverse arrangement of the plurality of programs A (old)-D (old) before updating written in nonvolatile memory 10.

Thereby, for example, even if a case, while writing the executive operation program for updating (program C (new), program D (new)), the user accidentally turned off the power supply, or the power OFF by power failure, or the like, is happened, by referring with the header information (new) reserved in nonvolatile memory 10, arrangement of the start processing program (program A (new), program B (new)), or the like, can be confirmed.

Also, after all the programs A (new)-D (new) for updating, or the like, is written in nonvolatile memory 10, by referring the header information (new), reading of the programs A (new)-D (new) can be ensured.

As the above-mentioned is summarized, in the controlling method of the flash type memory in the typical case as mentioned above, the number of erase times of each block in the flash type memory is manageable by the management information of the subordinate block of the program area. Thereby, the block number of erase times of the flash type memory can be equalized, and the lifetime of the flash type memory can be extended.

However, in the controlling method of the flash type memory in the typical case, for example, while the area modification accompanying a program rewritten by extension of a function, when the accidentally user turned off the power supply, or the power OFF by power failure, or the like, is happened, there is a possibility to be the starting failure status.

As compared with this, according to the electronic apparatus of the present disclosure, even if a case, while writing of the plurality of programs for updating in the nonvolatile memory,
the user accidentally turned off the power supply, or the power OFF by power failure, or the like, is happened, the program needed for rewriting of the program for updating, or the like, are reserved in the nonvolatile memory. Therefore, rewriting of the program for updating can be ensured, and it can avoid to be the starting failure status.

In addition, the configuration or the operation of the above-mentioned embodiment is an example, and it cannot be overemphasized that it can change suitably and can execute in the range that does not deviate from the aim of the present disclosure.

What is claimed is:

1. An electronic apparatus comprising:
    a nonvolatile memory that includes a plurality of programs including i) a start processing program needed for a start process, ii) an update executing program, and iii) a function executing program for executing a function, and header information, wherein:
    the header information includes a header information identifier, a header information size, information of the plurality of programs, and information of a head position of each of the plurality of programs; and
    the information of the plurality of programs includes an identifier for identifying each of the plurality of programs and size of each of the plurality of programs;
    a volatile memory that includes a plurality of new programs including a new start processing program, a new update executing program, and a new function executing program; and
    a processor that rewrites the plurality of programs in the nonvolatile memory with the plurality of new programs, thereby accompanying extension of the function; wherein the processor:
    executes a boot process when a power supply is turned on;
    reads the header information in the nonvolatile memory;
    confirms the size and an arrangement order of the plurality of programs in the nonvolatile memory;
    writes the plurality of new programs to the volatile memory from at least one of an SD card and a sever via a network;
    writes a new header information in the volatile memory, wherein the new header information includes information of an arrangement order of the plurality of new programs in the volatile memory that is reverse of the arrangement order of the plurality of programs in the nonvolatile memory;
    writes at first the new start processing program and the new update executing program to the nonvolatile memory from the volatile memory;
    writes the new header information to the nonvolatile memory from the volatile memory, when completing the writing of the new start processing program and the new update executing program to the nonvolatile memory; and
    writes the new function executing program to the nonvolatile memory from the volatile memory, when completing the writing of the new header information to the nonvolatile memory;
    wherein the processor further:
    writes the plurality of new programs to the volatile memory from at least one of the SD card and the sever via the network, according to the header information, the start processing program and the update executing program which have been remained as written in the nonvolatile memory, if the power supply is turned off while the writing of the new start processing program and the new update executing program;
    writes the plurality of new programs to the volatile memory from at least one of the SD card and the sever via the network, according to the start processing program and the update executing program which have been remained as written in the nonvolatile memory, if the power supply is turned off while the writing of the new header information; and
    writes the plurality of new programs to the volatile memory from at least one of the SD card and the sever via the network, according to the new header information, the new start processing program and the new update executing program which have been remained as written in the nonvolatile memory, if the power supply is turned off while the writing of the new function executing program.

2. The electronic device according to claim 1, wherein the electronic device includes an image forming apparatus, and the function includes at least one of a copy function, a printer function, and a facsimile function.

3. The electronic device according to claim 1, wherein the nonvolatile memory includes a NAND flash memory, and the volatile memory includes a random access memory (RAM).

* * * * *